US012393902B2

(12) United States Patent
Mcburnett et al.

(10) Patent No.: US 12,393,902 B2
(45) Date of Patent: Aug. 19, 2025

(54) CONTINUOUS AND ANONYMOUS RISK EVALUATION

(71) Applicant: EQUIFAX INC., Atlanta, GA (US)

(72) Inventors: Michael Mcburnett, Cumming, GA (US); Michael Reith, Alpharetta, GA (US); Terry Woodford, Kennesaw, GA (US); Patricia Bassetti, Alpharetta, GA (US); Abhinav Sinha, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 271 days.

(21) Appl. No.: 17/930,992

(22) Filed: Sep. 9, 2022

(65) Prior Publication Data
US 2023/0004890 A1    Jan. 5, 2023

Related U.S. Application Data

(63) Continuation of application No. 16/853,423, filed on Apr. 20, 2020, now Pat. No. 11,455,587.

(51) Int. Cl.
*G06Q 10/0635* (2023.01)
*G06F 3/04847* (2022.01)
(Continued)

(52) U.S. Cl.
CPC ..... *G06Q 10/0635* (2013.01); *G06F 16/2365* (2019.01); *G06F 16/2379* (2019.01);
(Continued)

(58) Field of Classification Search
CPC .. G06Q 10/0635; G06Q 40/03; G06Q 10/067; G06Q 10/105; G06Q 30/0185;
(Continued)

(56) References Cited

U.S. PATENT DOCUMENTS 6,026,397 A    2/2000  Sheppard
8,793,151 B2   7/2014  Delzoppo et al.
(Continued)

FOREIGN PATENT DOCUMENTS

CA    2782707 A1 *  6/2011  ......... G06Q 20/4016
EP    3133523 A1 *  2/2017  ........... G06F 21/552
(Continued)

OTHER PUBLICATIONS

Rasic, Alis. Anonymization of Event Logs for Network Security Monitoring. Diss. Concordia University, 2020. (Year: 2020).*
(Continued)

*Primary Examiner* — Thomas Yih Ho
(74) *Attorney, Agent, or Firm* — Kilpatrick Townsend & Stockton LLP (57) ABSTRACT

Techniques for risk evaluation include receiving, from a requesting entity, a request for monitoring target entities specifying a first identifier associated with each target entity and target entity information. The system generates a second identifier and a third identifier for each target entity and stores a mapping of the second identifiers to the first identifiers and the third identifiers, preventing the second identifiers from being provided to the requesting entity. The system monitors a periodically updated data set and determines risk metrics for the target entities, comparing each risk metric to a threshold value to identify target entities whose risk data indicates an insider threat. The system generates a third identifier for the identified target entities and provides the third identifiers to the requesting entity. Responsive to a request for a corresponding first identifier, the system identifies and provides the first and third identifiers to the requesting entity.

15 Claims, 5 Drawing Sheets

(51) Int. Cl.

| | | |
|---|---|---|
| *G06F 16/23* | (2019.01) | |
| *G06F 21/62* | (2013.01) | |
| *G06N 5/04* | (2023.01) | |
| *G06N 20/00* | (2019.01) | |
| *G06Q 10/067* | (2023.01) | |
| *G06Q 10/105* | (2023.01) | |
| *G06Q 30/018* | (2023.01) | |
| *G06Q 30/0204* | (2023.01) | |
| *G06Q 30/0601* | (2023.01) | |
| *G06Q 40/02* | (2023.01) | |
| *G06Q 40/03* | (2023.01) | |
| *G06Q 50/26* | (2024.01) | |

(52) U.S. Cl.
CPC ...... *G06F 21/6245* (2013.01); *G06F 21/6254* (2013.01); *G06N 5/04* (2013.01); *G06N 20/00* (2019.01); *G06Q 10/067* (2013.01); *G06Q 10/105* (2013.01); *G06Q 30/0185* (2013.01); *G06Q 30/0204* (2013.01); *G06Q 30/0615* (2013.01); *G06Q 40/02* (2013.01); *G06Q 40/03* (2023.01); *G06Q 50/265* (2013.01); *G06F 3/04847* (2013.01)

(58) Field of Classification Search
CPC .......... G06Q 30/0204; G06Q 30/0615; G06Q 40/02; G06Q 50/265; G06F 16/2379; G06F 16/2365; G06F 21/6254; G06F 3/04847; G06F 21/50; G06N 20/00; G06N 5/04

See application file for complete search history.

(56) References Cited

U.S. PATENT DOCUMENTS

| | | |
|---|---|---|
| 9,043,587 B1 | 5/2015 | Chen et al. |
| 9,607,336 B1 | 3/2017 | Dean et al. |
| 9,876,766 B2 | 1/2018 | Ukena et al. |
| 10,133,980 B2 | 11/2018 | Turner et al. |
| 10,270,790 B1 | 4/2019 | Jackson |
| 10,481,783 B1 | 11/2019 | Benkreira et al. |
| 10,558,913 B1 | 2/2020 | Turner et al. |
| 11,455,587 B2 | 9/2022 | McBurnett et al. |
| 2011/0167011 A1 | 7/2011 | Paltenghe et al. |
| 2015/0193638 A1 | 7/2015 | Cook |
| 2015/0242632 A1 | 8/2015 | Lay et al. |
| 2016/0203336 A1 | 7/2016 | Nambiar et al. |
| 2016/0344702 A1 | 11/2016 | Ukena et al. |
| 2017/0061345 A1 | 3/2017 | Jones, III et al. |
| 2017/0098093 A1 | 4/2017 | Koo et al. |
| 2017/0132431 A1 | 5/2017 | Gonzalez Blanco et al. |
| 2018/0025273 A1 | 1/2018 | Jordan et al. |
| 2018/0357714 A1 | 12/2018 | So et al. |
| 2019/0044969 A1 | 2/2019 | Pilkington et al. |
| 2019/0116051 A1 | 4/2019 | Rome et al. |
| 2019/0166153 A1* | 5/2019 | Steele .................. H04L 63/1441 |
| 2019/0260783 A1 | 8/2019 | Humphrey et al. |
| 2020/0128036 A1 | 4/2020 | Sarzynski et al. |
| 2020/0202425 A1 | 6/2020 | Taylor-Shoff et al. |
| 2020/0242689 A1 | 7/2020 | Steinbarth |
| 2020/0250315 A1* | 8/2020 | Sunkavally ......... G06F 21/6254 |
| 2020/0286169 A1* | 9/2020 | Pinizzotto ........... H04L 63/1433 |
| 2020/0293651 A1* | 9/2020 | Meyer ..................... G06F 9/542 |

FOREIGN PATENT DOCUMENTS

| | | | |
|---|---|---|---|
| EP | 3528462 A1 * | 8/2019 | ......... G06F 16/2455 |
| KR | 101575282 B1 | 12/2015 | |
| WO | 2019089439 A1 | 5/2019 | |
| WO | 2021059032 A1 | 4/2021 | |

OTHER PUBLICATIONS

U.S. Appl. No. 16/853,423, "Final Office Action", Nov. 16, 2020, 34 pages.
U.S. Appl. No. 16/853,423, "Non-Final Office Action", Jul. 24, 2020, 30 pages.
U.S. Appl. No. 16/853,423, "Non-Final Office Action", Jul. 30, 2021, 37 pages.
U.S. Appl. No. 16/853,423, "Notice of Allowance", May 6, 2022, 13 pages.
Dehghantanha, et al., "Privacy-Respecting Digital Investigation", 2014 Twelfth Annual International Conference on Privacy, Security and Trust, Jul. 2014, 10 pages.
Kyle, "Continuous Evaluation: Welcoming Government Employees to the World of Mass Surveillance", George Mason Law Review, vol. 23, 2015.
Wiermanski, et al., "Exploring the Use of Anonymized Consumer Credit Information to Estimate Economic Conditions: An Application of Big Data", Discussion Paper, Payment Cards Center, Nov. 2015, 31 Pages.
Canadian Application No. CA3,115,124, Office Action, Mailed on Jan. 4, 2024, 18 pages.

* cited by examiner

CONTINUOUS AND ANONYMOUS RISK EVALUATION

CROSS-REFERENCES TO RELATED APPLICATIONS

This application is a continuation of and claims priority to and the benefit of U.S. patent application Ser. No. 16/853,423, filed Apr. 20, 2020, entitled "CONTINUOUS AND ANONYMOUS RISK EVALUATION" the entire contents of which is hereby incorporated by reference in its entirety and for all purposes.

TECHNICAL FIELD

The present disclosure relates generally to data analytics. More specifically, but not by way of limitation, this disclosure relates to database improvements that provide the ability to link data anonymously between separate data sources.

BACKGROUND

As regulations protecting privacy become increasingly common and stringent, it becomes increasingly important to find ways to anonymously and securely handle data in distributed systems. Typically, when integrating data across different databases, personally identifying information (PII) is exchanged. Some solutions to reduce transmission of PII between systems include using a shared identifier as a placeholder for such PII data. However, even when transmitting a shared identifier, sensitive information can be extracted.

As an example application, risk monitoring is common in the context of credit. Such monitoring involves analyzing a great deal of data from widely distributed computing devices, as thousands of transactions are conducted every day, and each may have an impact on credit risk. Employers, such as government agencies, use credit reports as part of the background investigation process and for periodic review of employees. Particularly for government agencies handling sensitive information, the employees must also be periodically reviewed for risk indicators such as financial strain. Traditionally, these periodic reviews are conducted by retrieving employee credit reports from a credit monitoring service every few years or several times per year. However, a credit report is out of date the day after it is pulled. Thus, current methods for identifying risk indicators in such inside-threat contexts are inefficient and ineffective. Moreover, by sharing the credit report repeatedly, a credit inquiry is recorded to the credit file. Thus, frequent credit monitoring of an individual runs the risk of revealing the identity of the individual. This is particularly problematic in the case of individuals holding security clearances, as such information may be used to infer participation in intelligence agencies or other protected groups.

SUMMARY

Various embodiments of the present disclosure provide systems and methods for continuous and anonymous risk evaluation. A monitoring system may monitor a periodically updated dataset for warnings or indicators of an insider threat. An insider threat is a threat to an organization originating within the organization, such as from employees or contractors with access to data, computer systems, and security processes. An insider threat may, for example, arise if an employee falls under financial stress and sells confidential information. By identifying preliminary indicators of such an insider threat, losses can be prevented.

In one example, a server computer of a monitoring system can receive, from a requesting entity computer (e.g., associated with an employer), a request for monitoring of a plurality of target entities. For each target entity, of the plurality of target entities, the request comprises a first identifier associated with the target entity and information about the target entity. For each target entity, of the plurality of target entities, the server computer generates a second identifier associated with the target entity based on the information about the target entity, the second identifier being prevented from being provided to the requesting entity computer. The server computer generates a third identifier associated with the monitored target entity when a rule is satisfied or threshold exceeded. The generated result is associated by the third identifier for reference as a randomly-generated, transaction ID. The server computer stores, in a secure database, a mapping of the second identifier to the first identifier and the third identifier when a result is generated through monitoring. The server computer monitors a periodically updated data set and determines a risk metric for the target entity based on monitoring the periodically updated data set. The server computer compares the risk metric of the target entity to a threshold value to identify a subset of the plurality of target entities discovering events defined as risk indicators of an insider threat and assigns corresponding third identifiers. The server computer provides the third identifiers with the risk indicators to the requesting entity computer. Responsive to providing the third identifiers, the server computer receives, from the requesting entity computer, a request for a first identifier associated with a unique third identifier. The server computer uses the third identifier and the stored mapping to identify the requested first identifier, and provides the first identifier and the third identifier to the requesting entity computer.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

Features, aspects, and advantages of the present disclosure are better understood when the following Detailed Description is read with reference to the drawings.

DETAILED DESCRIPTION

Certain aspects and features of the present disclosure are directed to techniques for continuous and anonymous linking of data between separate data sources. The system may monitor a periodically updated dataset for warnings or indicators of an event, such as exceeding a threshold value on a credit attribute, and anonymously report on identified events.

In some embodiments, multiple identifiers are used to obfuscate sensitive data such as personally identifying information or derivatives thereof. A first computing system may hold PII, and use services offered by a second computing system to derive results based on the PII. The PII may be shared in association with a first identifier known to both the computing systems. This first identifier will not be further used by the second computing system unless the results should be revealed under limited circumstances. The second computing system uses a second identifier for internal analysis, which is mapped to the first identifier in a secure database. If the results of the data analysis indicate that the first computing system may deem it appropriate to "unmask" the result, then the second computing system may generate a third identifier, add the third identifier to the stored mapping, and transmit the third identifier to the first computing system without PII or the other identifiers. Only if the first computing system confirms that the results should be unmasked, will the second computing system use the stored mapping reveal the first identifier which the first computing system can link to the PII.

One application of these techniques is monitoring a population of target entities such as employees while remaining compliant with regulations. For example, the Fair Credit Reporting Act (FCRA) requires credit inquiries, such as an employer checking the credit of an employee, to be posted to the employee's credit report. This creates a tension with the need to safeguard such a population. If a particular employee is continuously being monitored, and this shows up on the employee's credit report, bad actors may be able to infer that this employee is likely in an agency that requires security clearances, which is a national security risk.

In some embodiments, multiple identifiers are used to obfuscate the identity of target entities such as employees that are being monitored. When a requesting entity such as an employer sends a request for monitoring, the requesting entity sends an identifier that identifies the target entity to both the requesting entity and the monitoring system. This identifier will not be further used by the monitoring system unless the requesting entity determines, based on anonymized risk information, that the identity of the target entity should be revealed. Only at this point will a hit be put on the credit file of the target entity. Accordingly, because the various target entities are being monitored anonymously, the credit hit will not occur during the monitoring phase, which prevents revealing the monitored population.

This can be achieved by leveraging a first identifier, a second identifier, and a third identifier for each target entity. The second identifier is generated based on information about the target entity, which may include personally identifying information such as a name, social security number, address, and so forth. The second identifier is used within the monitoring system to keep data associated with the target entity updated. The third identifier is randomly generated with the risk data and used to anonymously report the target entity's results.

The monitoring system gathers information about various target entities. The information may be obtained from periodic reports from credit reporting agencies, employers, courts, and the like. Relevant information may include whether an individual is past due on a credit instrument and how long (e.g., 30 days, 90 days, 120 days, etc.), debt amount, credit score, new credit inquiries, criminal record, and jobs held.

Based on the data about a given target entity, the monitoring system may determine a risk metric. The risk metric may be a defined event or may be determined using a predictive model such as a neural network or regression model. Such a model may be trained on a general population, filtered using characteristic traits, in order to further preserve privacy for the monitored population. Using the trained model, the system can generate a risk metric indicative of insider threat. The risk metric may factor in parameters such as days past due on a credit instrument, total debt, new debt, criminal activity, and/or unexpected changes in funds or employment.

In the event that a comparison of the risk metric to threshold value generates a result for the target entity which indicates an insider threat, the monitoring system may send a risk report or visualization that anonymously identifies a certain subset of the population as corresponding to different risk levels. The requesting entity can determine which individuals should have their identities revealed, and request the first identifier(s) for those individuals using the third identifier.

Upon receiving a request for the first identifier for a target entity, the monitoring system may transmit the first identifier and the third identifier back to the requesting entity. At this point, and not sooner, the credit file of the target entity may reflect the monitoring. Accordingly, the techniques described herein can limit the pattern of monitoring to those cases where an insider threat is most likely. This avoids unnecessarily exposing the identity of other target entities, protects their privacy, and increases the security and efficiency of the process.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example

Figure 1:
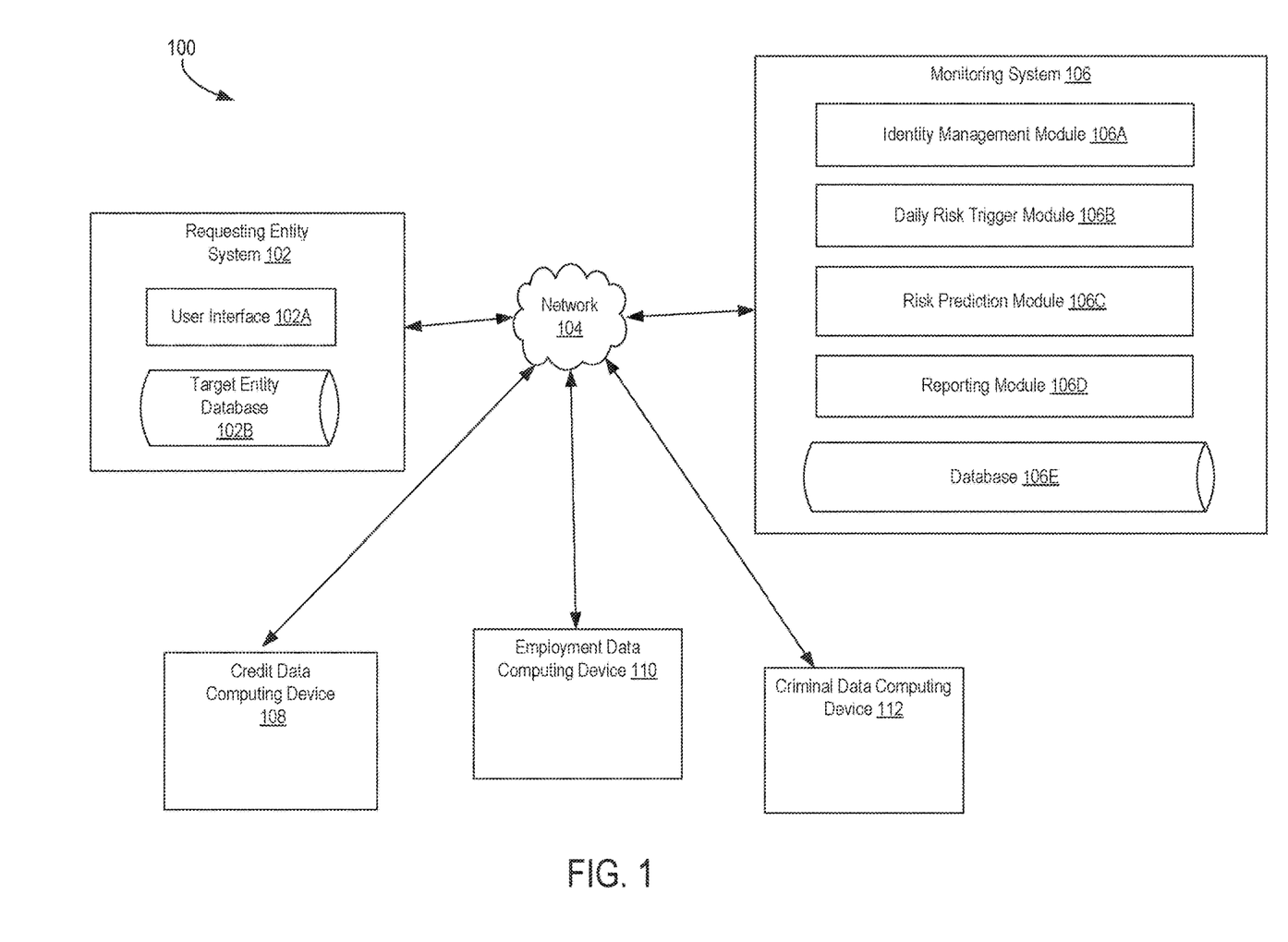
FIG. 1 is a block diagram depicting an example of an operating environment for continuous and anonymous risk evaluation, according to certain aspects of the present disclosure.

Referring now to the drawings, FIG. 1 is a block diagram depicting an example of an operating environment 100 for continuous and anonymous risk evaluation. FIG. 1 depicts examples of hardware components of an operating environment 100, according to some aspects. The operating environment 100 is a specialized computing system that may be used for processing large amounts of data using a large number of computer processing cycles. The numbers of devices depicted in FIG. 1 are provided for illustrative purposes. Different numbers of devices may be used. For example, while each device, server, and system in FIG. 1 is shown as a single device, multiple devices may instead be used.

The operating environment 100 may include a monitoring system 106. The monitoring system 106 may be a specialized computer or other machine that processes the data received within the operating environment 100. The monitoring system 106 may include one or more other systems. For example, the monitoring system 106 may include systems such as a communications grid (a grid-based computing system for processing large amounts of data).

The operating environment 100 may include a requesting entity system 102. The requesting entity system 102 may be associated with an entity, such as an employer, that seeks to monitor target entities, such as employees, for insider threats. An insider threat may, for example, correspond to an employee with characteristics which indicate a risk of exposing classified information, stealing, selling secrets, and/or the like. Thus, the requesting entity may use the services of monitoring system 106 to monitor for such an insider threat. The requesting entity system 102 may maintain a target entity database 102B storing information about one or more such target entities. The information about a target entity may include personally identifying information (PII) such as a social security number, name, address, employment history, and so forth. The target entity database 102B may further store a unique identifier of the target entity ("first identifier of the target entity"), which may be generated and/or assigned to the target entity by the requesting entity system 102. For example, the first identifier of the target entity may be a string of numbers and/or letters uniquely identifying the target entity to the requesting entity.

Figure 4:
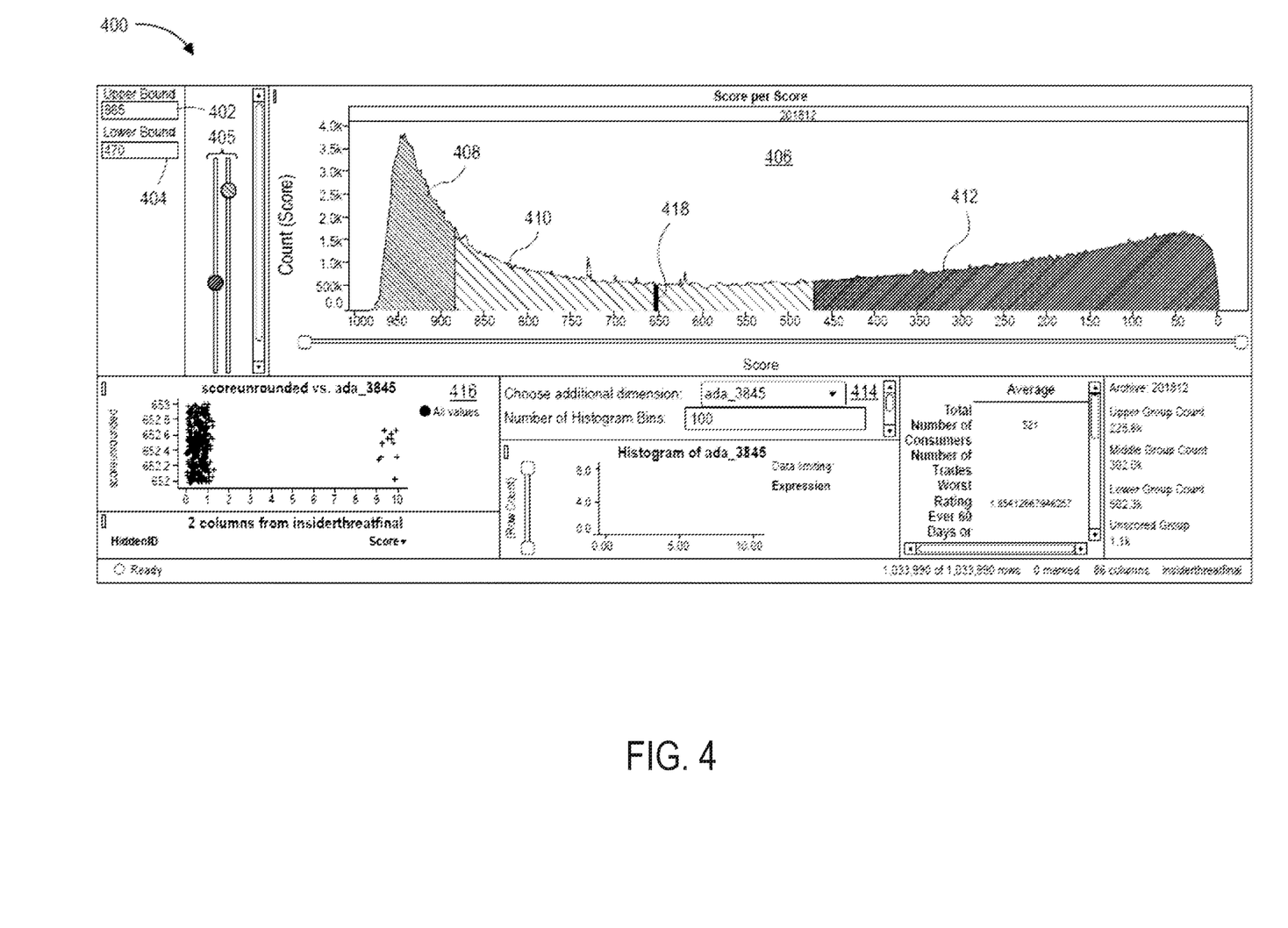
FIG. 4 is a screenshot of an interface for viewing and configuring risk output, according to certain aspects of the present disclosure.

The requesting entity system 102 may further include a user interface 102A. The user interface 102A may include elements for receiving user input and displaying information to a user. For example, the user interface 102A may include elements to accept user input specifying one or more target entities for which to provide information to the monitoring system 106. The user interface 102A may further include elements for accepting configuration parameters for risk monitoring of the target entities. The user interface 102A may further include functionality to display information to a user (e.g., results of risk monitoring, as illustrated in FIG. 4). The requesting entity system 102 may include a display element for displaying the user interface 102A.

The requesting entity system 102 may be communicatively coupled to the monitoring system 106. For example, the requesting entity system 102 may send data to the monitoring system 106 to be processed, may send signals to the monitoring system 106 to control different aspects of the computing environment or the data it is processing. The requesting entity system 102 may interact with the monitoring system 106 via one or more networks 104.

The requesting entity system 102 may include network computers, sensors, databases, or other devices that may transmit or otherwise provide data to monitoring system 106. For example, the requesting entity system 102 may include local area network devices, such as routers, hubs, switches, or other computer networking devices.

Each communication within the operating environment 100 (e.g., between client devices, between the requesting entity system 102 and the monitoring system 106 may occur over one or more networks 104. Networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the network 104. The networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The monitoring system 106 can include one or more processing devices that execute program code stored on a non-transitory computer-readable medium. The program code can include an identity management module 106A, a daily risk trigger module 106B, a risk prediction module 106C, and a reporting module 106D.

The risk prediction module 106C may include software configured to, in cooperation with a processor (e.g., processor 502 of FIG. 5), generate and apply a predictive risk model to target entity data. The predictive risk model may output a risk metric. The risk metric may be a representation of a risk level associated with a target entity. For example, the risk metric may be a numerical value and/or a yes/no answer. Examples of risk metrics include number of days past due on a credit instrument (e.g., if an employee is 30, 90, 120, or 150 days past due on any credit instrument such as a credit card, mortgage, car payments, etc.). Examples of risk metrics further include an amount of debt and/or an increase in debt. For example, threshold levels of debt or major increases in debt may be indicators of financial distress. As another example, criminal record status may be used as a risk metric (e.g., whether the target entity has been or is likely to be arrested, charged with a crime, and/or convicted of a crime). Another example of a risk metric is employment status, such as whether a target entity is holding multiple jobs. In many cases, a condition of employment is that an employee does not hold additional jobs. Another example of a risk metric is a number of credit instruments held by the target entity (e.g., is the target entity suddenly opening multiple credit cards). As another example, an amount of funds held by the target entity may be used as a risk metric. This can be used to monitor for unexplained wealth, which may be associated with increased risk. For example, if a target entity has been making minimum payments on a mortgage and suddenly pays off the entire mortgage, with no windfall on record, this can be considered unexplained wealth.

In some embodiments, the risk metric may be a combination of such factors. For example, a formula, such as a linear combination of factors, may be used to arrive at a risk metric. As a specific example, the risk metric may be $$\text{Risk}=5*(\text{Days Past Due})+3*(\text{New Credit})+100*(\text{New Job}) \quad [1]$$

In some cases, the risk prediction module 106C may maintain multiple configurable risk metrics. For example, a first requesting entity system may be interested in whether any employees are 120 days past due on any credit instrument, while a second requesting entity system may be interested in a combination of factors, e.g., based on Equation 1 above.

The risk prediction module 106C may maintain one or more threshold values for the risk metric(s). The threshold values may be configured by the requesting entity system 102. For example, a user may interact with the user interface 102A to specify a threshold, such as 120 days past due on a credit instrument, $30,000 in debt, and so forth. Different requesting entities may establish different thresholds. A given requesting entity may establish different thresholds for different target entities and/or contexts. Alternatively, or additionally, the monitoring system 106 may establish threshold values(s). For example, based on analysis of historical data, the monitoring system 106 may determine that 90 days past due is an appropriate threshold given past employee behaviors. In some cases, a threshold determined by the monitoring system 106 may be used as a default value which may be modified via the user interface 102A.

The risk prediction module 106C may also include functionality to execute an automated modeling algorithm (e.g., an algorithm using logistic regression and/or neural networks) that can learn or otherwise identify relationships between predictor variables and response variables. In some aspects, the risk prediction module 106C can train or otherwise develop such an algorithm. The risk prediction module 106C may receive a variety of different data from the database 106E, which may be used to train or refine the models.

The daily risk trigger module 106B may include those events, defined by the first computing system, as risk rules or thresholds, when satisfied or exceeded respectively, are to generate an anonymized risk report for the first computing system.

The database 106E can include memory devices for storing data to be processed by the monitoring system 106. The database 106E may also store a variety of different types of data organized in a variety of different ways and from a variety of different sources. For example, the database 106E may include storage other than primary storage located within monitoring system 106 that is directly accessible by processors located therein. The database 106E may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored. Examples of a non-transitory medium may include, for example, a magnetic disk or tape, optical storage media such as compact disk or digital versatile disk, flash memory, memory or memory devices. The database 106E may be a secure database. The data stored in the database 106E may be secured using measures such as cryptography, network traffic monitoring, and secure hardware elements.

The database 106E may store data gathered from computing devices such as credit data computing device 108, employment data computing device 110, and criminal data computing device 112 via network 104.

The credit data computing device 108 is a computing device configured to generate data related to credit records and financial transactions of a target entity. The credit data computing device 108 may, for example, be associated with a bank, credit card provider, or other lender. The credit data computing device 108 may gather data about one or more target entities and transmit the data to the monitoring system 106 periodically or continually. For example, a large number of data can be generated by electronic transactions. This data can be used to generate information such as whether, and by how long, a target entity is past due on a credit instrument, an amount of debt associated with the target entity, and so forth. The data gathered and/or generated by the credit data computing device 108 may describe prior actions or transactions involving a target entity (e.g., information that can be obtained from credit files or records, financial records, consumer records, or other data about the activities or characteristics of the target entity).

The employment data computing device 110 is a computing device configured to generate data related to employment records of a target entity. The employment data computing device 110 may, for example, be associated with an employer, or an employment verification service. The employment data computing device 110 may track when entities initiate and terminate employment with different employers.

The criminal data computing device 112 is a computing device configured to generate data related to criminal records of a target entity. The criminal data computing device 112 may, for example, be associated with a police department, federal agency, or criminal screening service. The criminal data computing device 112 may record data associated with entities being charged with crimes, arrested, convicted, and so forth.

In some aspects, the database 106E can also store any intermediate or final data generated by one or more components of the operating environment 100. For example, the database 106E may store determined or configured threshold values, risk values generated by the risk prediction module 106C, and/or the like.

The identity management module 106A may include software configured to, in cooperation with a processor (e.g., processor 502 of FIG. 5), manage different identifiers for a target entity in order to preserve privacy. In addition to the first identifier established by the requesting entity system 102, the identity management module may generate and manage additional identifiers for the target entity. The identity management module 106A may generate a second identifier of the target entity, based on the target entity information received from the requesting entity system 102. The identity management module 106A may generate a third identifier associated with the target entity's risk reports that is not directly linked to any PII. Data may be "directly linked" to other data if it is mapped to the other data directly in a same mapping or table—for example, the first identifier may be directly linked to PII in a table maintained by the requesting entity. The third identifier may be mapped to the first identifier in a separate table which does not include the PII. The identity management module 106A may generate and store mappings between the first, second, and/or third identifiers for each monitored target entity.

The reporting module 106D may include software configured to, in cooperation with a processor (e.g., processor 602 of FIG. 6), generate and transmit information generated by the risk prediction module 106C to the requesting entity system 102. In some embodiments, the reporting module 106D may transmit information to cause display of a user interface (e.g., user interface 102A) including a visualization of risk data for a plurality of target entities. As shown in FIG. 4, the user interface may include visualizations indicating trends and statistics for a set of target entities. A user can drill down to explore different populations of target entities, and request more detailed information about one or more target entities. Alternatively, or additionally, the reporting module 106D may transmit information to the requesting entity system 102 using other channels, such as via a message or Application Programming Interface (API) push over a network. In some cases, the reporting module may transmit a risk report to the requesting entity system 102. Such a risk report may be anonymized.

Figure 2:
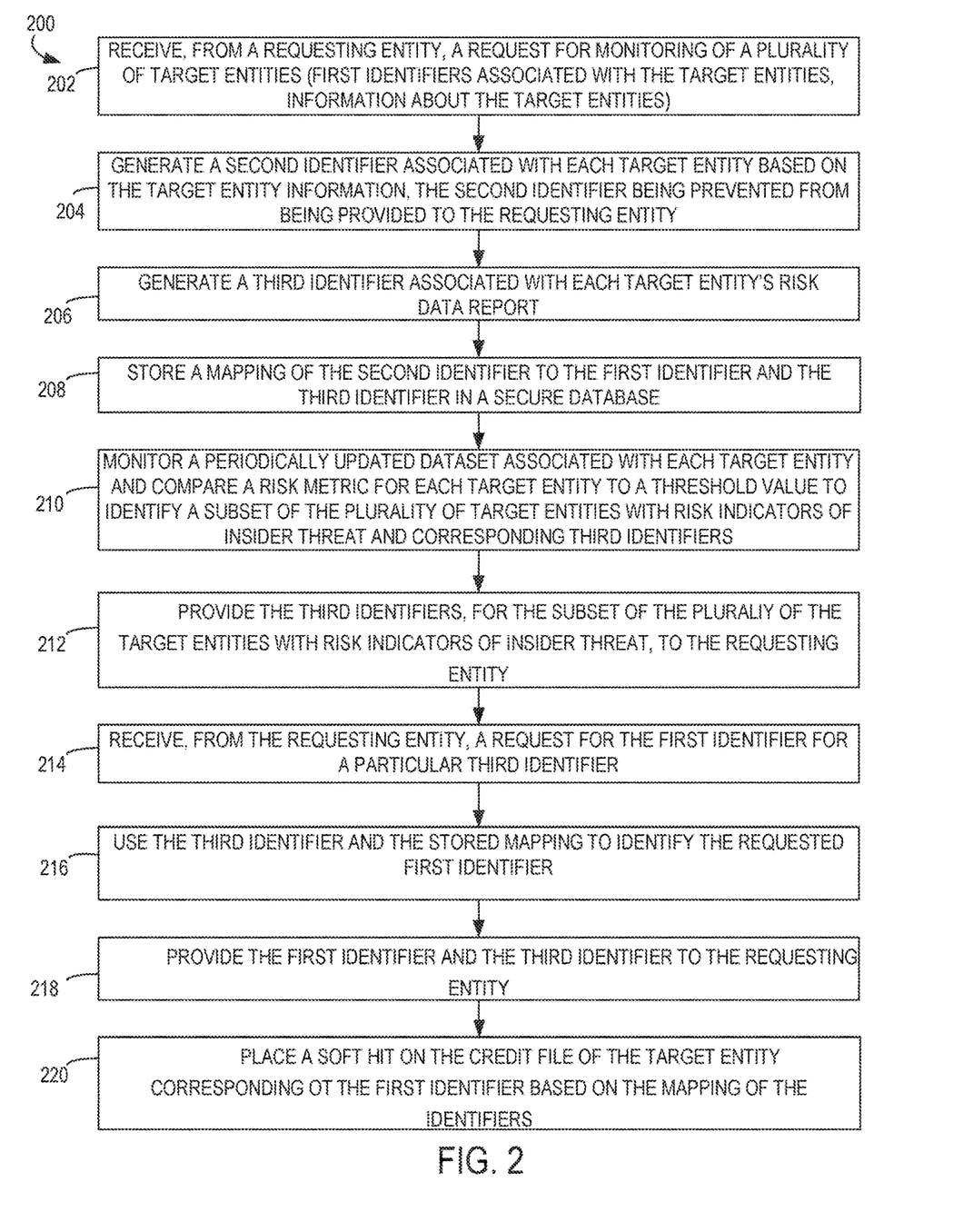
FIG. 2 is a flow chart depicting an example of a process for continuous and anonymous risk evaluation, according to certain aspects of the present disclosure.

FIG. 2 is a flow chart depicting an example of a method 200 for continuous and anonymous risk monitoring of a target entity for an insider threat. The method 200 may be performed by a server computer that is part of the monitoring system 106, in cooperation with other devices as depicted in FIG. 1. The processing depicted in FIG. 2 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel.

At step 202, the server computer receives, from a requesting entity, a request for monitoring of a plurality of target entities. For each target entity, the request includes a first identifier associated with the target entity and sufficient information about the target entity to identify him or her. For example, the requesting entity is an employer with a set of employees subject to security clearances. The requesting entity seeks to receive preemptive notification if some subset of these target entities are in compliance with eligibility requirements for their security clearances. The request may include a list of such target entities.

The first identifier may be provided by the requesting entity to the server computer for each target entity. The first identifier associated with each respective target entity may be a unique identifier assigned to the target entity by the employer. For example, a first identifier may be a string of letter and/or numbers such as an employee identifier (ID), and may, in special circumstances be a social security number or name. The first identifier may be persistent through adds and deletes which must be periodically coordinated by both parties in order to stay FCRA-compliant for consent-based monitoring. The monitoring system may create a table of first identifiers (e.g., an employee table) for the requesting entity for future reference.

The information about a given target entity may include personally identifiable information such as name, address, telephone number, hire date, job history, type of security clearance held, and so forth. In some embodiments, some or all of the information about a target entity is stored in a mapping to the corresponding first identifier. For example, a stored table of first identifiers may include one or more columns for PII-based parameters for each of a set of employees.

At step 204, the server computer generates a second identifier associated with each target entity based on the target entity information. The second identifier may be an identity key generated by conducting a search, match, and key process comparing the target entity information received from the requesting entity to target information stored by the monitoring system file in order assign a persistent, system-key to each target entity for monitoring.

The server computer may import the received set of first identifiers and information associated with the target entities, of the plurality of target entities. Each respective set of target entity information may be keyed. The resulting second identifier may be stored to a credit header file using any of several keying elements. These may include social security number, full name, address, prior address(es), zip code, or other individual characteristics that help uniquely identify individuals. The server computer may generate the second identifier by keying, hashing, or cryptographically modifying some or all of the target entity information. For example, the second identifier may be a hash of a target entity's social security number. As another example, the second identifier is a fuzzy hash of the set of information for a given target entity. The second identifier may uniquely identify the target entity based on the information about the target entity, and may be linked to the credit file of the target entity.

In some embodiments, the set of target entity information and identifiers received from the requesting entity is housed in a master portfolio associated with that requesting entity. Other portfolios may be maintained for other requesting entities. In cases where target entities may be simultaneously monitored by multiple requesting entities, which may happen if a person is employed by one government agency and seconded to another, the target entity may appear in more than one master portfolio and be monitored with two or more sets of target entities.

Step 204 may be performed, in turn or simultaneously, for each target entity monitored. A set of second identifiers for the requesting entity may be loaded on the monitoring system with a set of risk rules used to configure the risk monitoring of the target entities.

In some embodiments, the second identifier is prevented from being provided to the requesting entity. The server computer may refrain from transmitting the second identifier to the requesting entity or otherwise revealing the second identifier to the requesting entity.

At step 206, the server computer generates a third identifier associated with each target entity. The third identifier is associated with the target entity's risk report, as described below with respect to step 212. The third identifier is an identifier which both computer systems can use to reference the specific risk data report. The third identifier is randomly generated and unique. The third identifier may be a smart key that uniquely identifies the target entity. The third identifier may, for example, be a universally unique identifier (UUID).

The third identifier may be automatically generated when the monitoring system generates a result because a rule is satisfied or a threshold exceeded. Alternatively, in some embodiments, generating the third identifiers may be performed responsive to identifying target entities when events indicate an insider threat at step 210. In this case, the server computer may generate the third identifier for those target entities that have indications of an insider threat risk.

At step 208, the server computer stores a mapping of the second identifier to the first identifier and the third identifier to the first identifier and the second identifier in a secure database. The server computer may, for example, store a table of employees for each requesting entity. Such a table may include entries for first identifiers and second identifiers. The table may further include entries for the third identifiers for each target entity, which can be used to link the third identifier to the first and second identifiers. Alternatively, or additionally, the mapping may be established using pointers or otherwise linking the first identifier, second identifier, and third identifier for each respective target entity. Accordingly, the third identifier can be used as an anonymous identifier that links the first identifier to the second identifier, as the third identifier is not directly linked to PII identifying the target entity.

At step 210, the server computer monitors a periodically updated dataset associated with each target entity and compares the risk metric for each target entity to a threshold value to identify a subset of the plurality of target entities with risk indicators of insider threat. The server computer may identify the third identifiers corresponding to those target entities' reports which indicate a risk associated with an insider threat.

Depending on the risk metric used, a particular target entity may require further inquiry to determine whether the target entity poses an insider threat if the risk metric exceeds a threshold value (e.g., if the risk metric increases with risk such as days past due or debt amount), or if the risk metric is less than a threshold value (e.g., if the risk metric decreases inversely with risk such as credit score). Alternatively, or additionally, a risk metric may be satisfied by definition (e.g., for a binary risk metric, e.g., whether the target entity has been arrested). Each time the server computer determines that for a particular target entity a risk-defined rule has been met this generated result may constitute a "risk event" indicative of an insider threat.

The server computer may monitor periodically updated datasets via external computing devices over a network. For example, the server computer may monitor data associated with one or more target entities via credit data computing device 108, employment data computing device 110, and criminal data computing device 112. Alternatively, or additionally, the server computer may monitor a periodically updated dataset associated with each target entity, as stored locally in database 106E. Database 106E may be periodically updated, e.g., as reports are received from credit data computing device 108, employment data computing device 110, and criminal data computing device 112. Data from one or more periodically updated datasets may be used to determine the risk metric.

In some embodiments, the risk metric may be determined using a predictive model. As an example, the predictive model may be a logistic regression model. A logistic regression model can model the probability of an event occurring—e.g., the likelihood of a target entity accumulating a certain amount of days past due on a credit instrument, debt value, and so forth. The probability that a variable y=1 (e.g., is true) is given by $$P(y^{(t)} = 1) = \frac{1}{1 + \exp[-(\beta_0 + \beta_1 x_1 + \ldots + \beta_i x_i)]}, \quad [2]$$

where $\beta_0, \beta_1, \ldots \beta_i$ are parameters of the model and x is an observation (e.g., an observed value from target entity data).

Alternatively, or additionally, the predictive model may be a neural network. As a specific example, a regulatory compliant neural network may be implemented. A regulatory compliant predictive model may include an optimized neural network that can allow the neural network to be used for both accurately determining risk metrics and generating explanatory data. The explanatory data can indicate how certain factors impacted the risk metric or other output that is generated using the model. Such a neural network may be trained using data corresponding to credit and financial transactions, employment events, and criminal records. Techniques for implementing a regulatory compliant neural network are described in U.S. Pat. Nos. 10,133,980 and 10,558,913 and U.S. Patent Pub. No. 2018/0025273.

In some embodiments, the predictive model is trained on data from a general population of entities segmented based on age and income level to approximate a target population of entities. For example, a group of employees of a particular government agency is monitored. Rather than training the predictive model on data associated with these employees, which could expose the identity of the employees by using only their data for, the predictive model is trained on a general population. The general population may be filtered to more closely approximate the population of target entities. For example, the training data may be filtered to include people that are U.S. citizens and high school graduates over the age of 20. This can result in a population that is statistically similar to those employed by the requesting entity, which can in turn provide more accurate predictions.

In some embodiments, a predetermined threshold value is compared to the risk metric. In some embodiments, the threshold value may be compared to the output of the model. For example, the model outputs a number of days past due and this is compared to the threshold value of 120 days past due. Alternatively, or additionally, the model may directly produce a result of the comparison of the risk metric and the threshold. For example, a logistic regression model may be configured with a certain probability value corresponding to the predetermined threshold.

In some embodiments, the model and/or the threshold value may be configured for a requesting entity. The server computer may receive configuration data, including a threshold value for a particular parameter, from a requesting entity. The configuration data may be received, for example, via the user interface, via a message, or via batch files to an API. Based on the threshold value and the particular parameter, the server computer may customize the predictive model for the requesting entity. For example, a first requesting entity may be interested in whether any employees are 90 days or more past due on a credit instrument. A second requesting entity may be interested in whether any employees have a 100% increase in debt in a reporting period. A third requesting entity may be interested in whether a multi-factor risk metric exceeds a value of 90, where the risk metric is computed based on a combination of late payments, debt amount, and employment status changes. Accordingly, the model and/or threshold values can be tailored for different requesting entities. Alternatively, or additionally, a given requesting entity may use different criteria for different populations of target entities (e.g., managers vs. cashiers, or employees with a secret clearance vs. employees with a top secret/sensitive compartmentalized information (TS/SCI) clearance). This results in a standardized rule set across all people with specific clearances while also segmenting the population so all persons in a particular "class" are treated identically.

The server computer may, simultaneously or in turn, apply one or more risk models to the plurality of target entities to identify a subset of the plurality of the target entities that are likely to pose an insider threat. For example, the server computer may apply a risk model to data corresponding to 1,000 employees, and identify a subset of five employees that are likely to go 120 days past due on a credit product.

In some embodiments, the risk metric is determined on demand. The risk metric may be computed periodically. In some cases the risk metric is determined based on an interval specified by the requesting entity. For example, the interval can be daily, weekly, monthly, or any other desired interval.

At step 212, the server computer provides the third identifiers to the requesting entity. The server computer may transmit the third identifiers in association with risk information. The risk information may include a defined event or the risk score. Alternatively, or additionally, the risk information may include underlying data used to generate the risk score. The risk information may include data indicating what is driving the individual score downward the most (using the top four downward drivers). This could include derogatory information on the credit file, unexplained income, criminal activity, and so forth. The server computer may provide the third identifiers for the subset of the plurality of the target entities with risk indicators of insider threat. In some embodiments, the server computer may further provide the third identifiers for additional target entities. For example, the server computer may cause display of a visualization of a set of monitored target entities with corresponding risk metrics, which may be above or below the threshold.

The server computer may provide the third identifiers via a user interface (e.g., similar to that illustrated in FIG. 4). The user interface can accept user input to manage individual risk reports at the program level consistent with risk tolerance policy and procedures. The server computer may cause display of a user interface including a visualization of risk data for a plurality of target entities that includes the third identifier. Causing display may include transmitting program instructions for rendering interface elements, thereby causing the reporting entity system to display the user interface as specified by the server computer. The visualization of risk data for a plurality of target entities may, for example, include graphs illustrating different risk levels for a set of target entities. User input may be accepted to drill down, revealing the third identifier(s) associated with one or more such target entities.

In some embodiments, the user interface may be in the form of a visualization portal (e.g., the user interface 102A) that maps over time the risk profile of an entire employment portfolio (e.g., a set of target entities as specified in the request of step 202). The entire employee portfolio being monitored can be assessed in the user interface, as illustrated in FIG. 4. The visualization can be segregated based on risk metrics, or other attributes available.

Providing the third identifier may include transmitting, by the server computer to the requesting entity over a network, an anonymized risk report including the third identifier which is then the transaction ID for reference. Such a risk report may include information such as a list of third identifiers and corresponding risk metrics. The anonymized risk report may contain details of risk metrics and other risk attributes contained in the risk model. Additional information that may be included in the risk model includes employment conflicts and metadata associated with the requesting entity. The server computer may refrain from including any identifying information such as the first identifier, second identifier, or name, at this point.

Within the risk report, or separately, rejected records may be reported back to the requesting entity. For example, if records are not found for a particular target entity, or if a target entity should no longer be monitored (e.g., if a particular target entity is no longer employed by the requesting entity), then the server computer may transmit to the requesting entity an indication such as 'Records not Found' or 'Invalid Records' for review, update, or other action by the requesting entity.

The risk report may be transmitted to the requesting entity via a message, API push/pull, and/or the like. The third identifiers may be provided using a message or visualization, while refraining from including first identifiers, second identifiers, or PII (e.g., target entity information) in the message or visualization.

In some embodiments, risk information is reported to the requesting entity on a periodic basis. For example, on a daily basis, appropriate risk triggers are reported anonymously and aggregated to the requesting entity. Thus, the risk information transmitted at step 212 may be both anonymous and aggregated, protecting the privacy of the individual target entities and remaining consistent with FCRA and Gramm-Leach-Bliley Act (GLBA) requirements.

At step 214, the server computer receives, from the requesting entity, a request for the first identifier for a particular third identifier (e.g., associated with a particular risk report). The request for the first identifier may be received via the user interface (e.g., a user may click on a particular third identifier or risk metric in the interface). Alternatively, or additionally, the request for the first identifier may be received via a network message and/or API exposed by the server computer. Accordingly, for individual risk decisioning, the requesting entity may request the server computer to "unmask" the risk report of the target entity. Such a request may include the third identifier, which the server computer can use to identify the requested information.

The requesting entity may request such an unmasking of one or more target entities based on a target entity's risk metric exceeding some defined threshold for credit monitoring (or other monitoring as appropriate). For example, the requesting entity may be interested in all employees trending toward 120 or more days past due on any credit products as defined by the employee going 90 days past due. Such reported behavior could lead to an unmasking request for specific employees.

At step 216, the server computer uses the third identifier and the stored mapping to identify the requested first identifier. The server computer may identify the stored mapping for the requesting entity responsive to receiving a request for the first identifier from the requesting entity at step 214. The server computer may identify the first identifier from third identifier contained within the request. Alternatively, or additionally, the server computer may identify the third identifier in association with the request, e.g. if the request is received from an interface linked to the third identifier or in response to a notification containing the third identifier. The server computer may use the stored mapping to identify a target entity first identifier corresponding to the specified third identifier.

In some embodiments, the server computer may confirm that rules permit sharing the first identifier corresponding to a risk event given the context. For example, rules may require that unmasking is allowed only within 14 days from run date (e.g., the date of the latest data used to generate the risk metric). For data beyond 14 days old, the result may be out of date and may not be in compliance with FCRA regulations. Alternatively if the unmasking request exceeds 14 days from the date of the trigger report, then a new trigger report may be run and those results used to generate the new report. As another example, the server computer may confirm that the target entity is still employed by the requesting entity.

At step 218, the server computer provides the first identifier and the referenced third identifier to the requesting entity as a key pair which allows the requesting entity to match the risk data to their employee. The server computer may provide the first identifier by transmitting the first identifier in a message over the network The server computer may send the first identifier without sending any PII about the target entity. The requesting entity can then use its own records to identify the target entity based on the first identifier when combined with the third identifier. The server computer provides the third identifier and the first identifier to the requesting entity computer together as a key pair for reference to the target identity and the risk data.

At step 220, every time the server computer reveals the first identifier associated with a risk event, the server computer may post a "soft hit" associated with an employer inquiry to a credit file of the target entity. The soft hit may be placed based on the mapping of the identifiers. After conducting the monitoring at step 210 using the third identifier, the server computer may use the mapping of the third identifier to the second identifier to identify the associated credit file and place the credit inquiry on the file. The techniques described herein avoid the need to post such a credit hit during the monitoring process, as the monitoring is done for groups of target entities in an anonymous fashion, which does not trigger FCRA requirements to post a credit hit until the identity is unmasked at step 218.

These techniques integrate the three identifiers, or key sets, in order manage PII risk by separating "risk" data from "identity" data in local operations and delivery. This data separation obviates the risk of discovery of PII associated with risk data on either the monitoring system or the requesting entity system. Discovery of PII can be a major privacy and security concern. These techniques provide an FCRA-compliant, employee risk-management solution without creating the unintended consequence of discoverable patterns.

Figure 3:
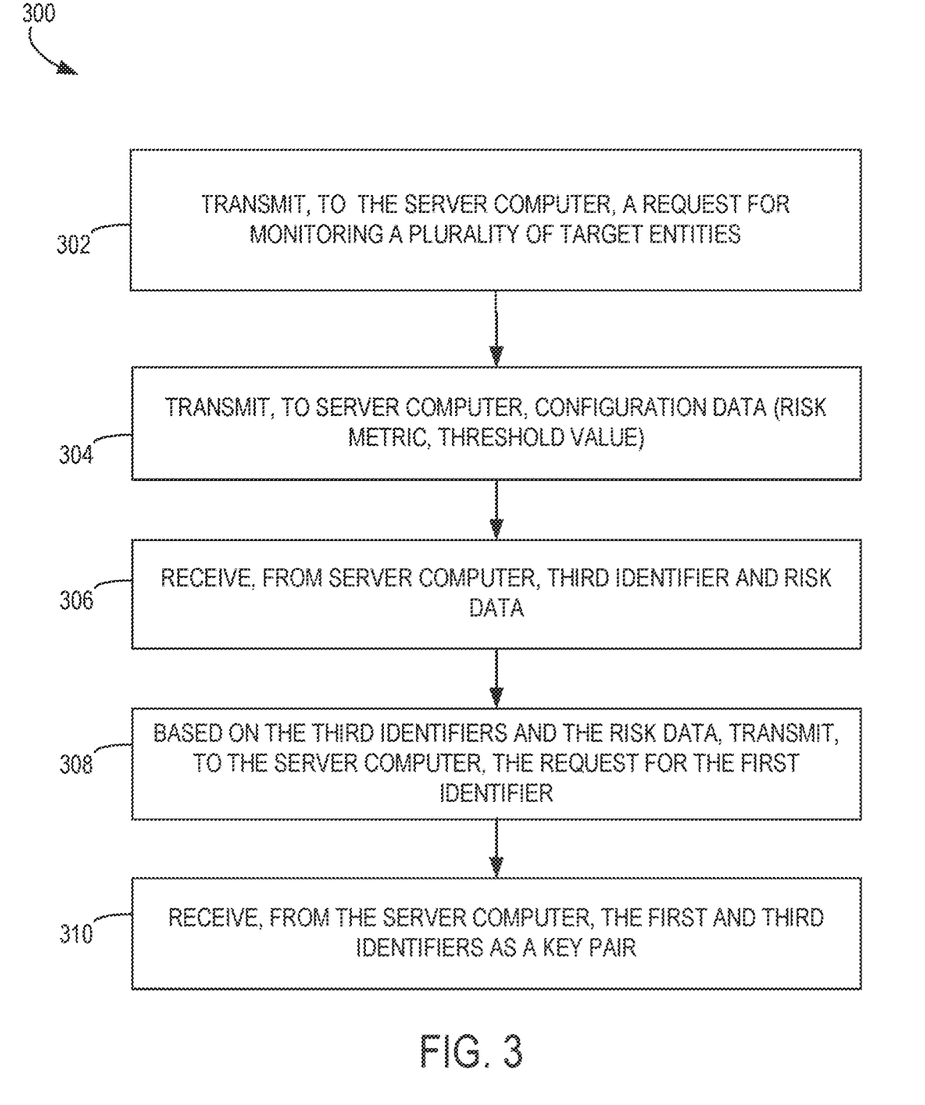
FIG. 3 is a flow chart depicting an example of a process for configuring and requesting insider threat risk monitoring, according to certain aspects of the present disclosure.

FIG. 3 is a flow chart depicting an example of a method 300 for requesting and configuring anonymous risk monitoring. The method 300 may be performed by a requesting entity computer that is part of the requesting entity system 102, in cooperation with other devices as depicted in FIG. 1. The processing depicted in FIG. 3 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel.

At step 302, the requesting entity system transmits, to the server computer, the request for monitoring the plurality of target entities. The request corresponds to the request received at step 202 of FIG. 2, and includes a first identifier for each target entity and information about each target entity.

At step 304, the requesting entity system transmits, to the server computer, configuration data specifying the risk metric and the threshold value. Risk thresholds may be defined by the target entity. For example, the risk metric and the threshold value may be transmitted by the requesting entity to the server computer via batch files, APIs, and/or the customization interface. As a specific example, an administrator associated with the requesting entity may interact with the customization interface to specify the risk metric number of days trending past due on mortgage and the threshold value 120.

When a requesting entity is ready to start portfolio risk monitoring, the requesting entity may initiate an onboarding and configuration setup process. The requesting entity may configure appropriate data sources to monitor, integration methods, and delivery mechanisms.

Subsequently, the monitoring system may monitor one or more periodically updated datasets, based on the configuration data, PII, and first identifiers provided by the requesting entity. This may be performed as described above with respect to FIG. 2.

At any point, the requesting entity may send updates and delete requests to manage the monitored population. As an example of the former, while the server computer is monitoring a particular target entity, the requesting entity may receive updated PII related to the target entity (e.g., the target entity changed her name). The requesting entity computer may transmit the updated PII to the server computer, which can be used to update the stored PII and/or keys to obtain more accurate data. As an example of the latter, the requesting entity may terminate employment of a particular target entity, at which point the target entity should no longer be monitored. The requesting entity may transmit a request for the server computer to delete the records for that target entity. In response, the server computer will delete the records stored in association with the target entity and cease monitoring the target entity.

At step 306, the requesting entity system receives, from the server computer, the third identifier and risk data. As described above with respect to steps 210-212 of FIG. 2, the server computer may transmit the third identifier to the requesting entity system upon comparing one or more risk metrics, associated with one or more respective target entities, with the established threshold value. The requesting entity may receive a risk report, or identify a population of target entities that are likely to pose an insider threat via the interface. The risk report may further include risk data such as scores associated with risk attributes contained in the risk model, employment conflicts, and so forth. Alternatively, or additionally, the requesting entity system may retrieve the risk data responsive to user interaction with the interface. For example, a user may click on a third identifier, causing a modal to be displayed listing risk data associated with the corresponding target entity.

At step 308, based on the third identifiers and the risk data, the requesting entity system transmits, to the server computer, the request for the first identifier. The requesting entity system may determine, based on the risk data and/or the third identifier, that the corresponding target entity should be identified. For example, the requesting entity system may determine that the identity of the target entity should be revealed based on the risk metric exceeding the threshold value. Alternatively, or additionally, the requesting entity may determine that the identity of the target entity should be revealed based on risk data such as parameters used to identify the risk metric (e.g., the risk metric is based on a combination of factors, one of which prompts the requesting entity to request the first identifier for a target entity).

The requesting entity system may, for example, transmit the request for the first identifier by transmitting a file comprising a set of third identifiers to the monitoring system in a message over a network. Such a message may further include an indicator specifying that the first identifier should be provided. Alternatively, or additionally, a user may interact with the interface to select a target entity, or group of target entities, to reveal by selecting a group defined by risk metrics and/or third identifiers.

Subsequently, the server computer may identify and return the first identifier with the third identifier, as described above with respect to steps 216-218 of FIG. 2.

At step 310, the requesting entity computer receives, from the server computer, the first and third identifiers as a key pair. Upon receiving the first identifier, the identity of the target entity becomes known to the requesting entity, since the first identifier has a known association with target entity PII in the requesting entity system.

FIG. 4 a screenshot of an example of a user interface 400 for viewing and configuring risk output, according to certain aspects of the present disclosure. The user interface 400 includes a set of visualizations indicating risk data associated with a set of target entities in an aggregated and anonymous fashion. The visualizations include a distribution 406 of risk metrics for the set of target entities.

The distribution 406 shows 1000 vertical bars associated with possible employment risk metrics. Two vertical sliders 405 can be used to accept user input configuring an upper bound 402 and lower bound 404 to contract the cutoff scores for dividing the population under review into manageable segments. The distribution 406 is color coded into three regions. The first region 408 corresponds to a population of target entities that are least likely to default on a credit instrument. In this case, the higher the risk metric, the less risky the target entity. Those target entities with risk metrics over about 880 are considered the least risky. Accordingly, a requesting entity may be less interested in target entities corresponding to the first region 408.

The second region 410 corresponds to a mid-range default population, or target entities that are moderately risky. The third region 412 corresponds to target entities that are most likely to default, i.e., target entities that are the most risky out of the monitored population. Accordingly, a requesting entity may be most interested in drilling down into the population of most risky target entities as defined by the third region 412.

Upon receiving user input moving the sliders 405, the segment of target entities displayed can be expanded or contracted. For example, a requesting entity may have a certain number of analysts available. The number of target entities may be adjusted to suitable level based on the number of available analysists. As a specific example, in FIG. 4, there are 502,000 target entities in the highest risk group corresponding to the third region 412, which would require many analysts to evaluate. An analyst can adjust the sliders to break off a region of interest into an appropriate quantity for analysis.

The lower panels allow an analyst to use the attributes in the model to identify outliers in the monitored population. Box 414 includes interface elements configured to accept user input to select an additional dimension. An attribute, ada_3845, has been selected. This attribute corresponds to a percentage of revolving trades opened within six months to all revolving trades, and ranges from 1% to 92%.

Box 416 shows a distribution of target entities identified by the vertical bar 418 in the distribution 406. This corresponds to 521 target entities having a risk metric of 660. The lower left scatterplot shows that these people fall into two categories: a group that is missing (value 93 or higher—shown as greater than 9 on the plot) and those whose values indicate that about 10% or less of their trades have been opened in the last six months.

This is useful when looking for groups of target entities seeking new credit, which is behavior that can emerge when a target entity encounters financial distress. This is an indication or warning of possible financial stress.

Such an interface may also be used to initiate revealing the identity of one or more target entities (e.g., by displaying a first identifier, which has a known association with a particular target entity in the requesting entity system). For example, the interface may receive user input drilling down into the population of higher risk entities, to the point of selecting a particular target entity. Responsive to user selection of a particular target entity, the interface may display the third identifier, with a prompt such as "reveal identity?" If input is received confirming that the identity should be revealed, then the interface may display the first identifier of the selected target entity.

Computing Environment Example for Anonymous Risk Monitoring Operations

Figure 5:
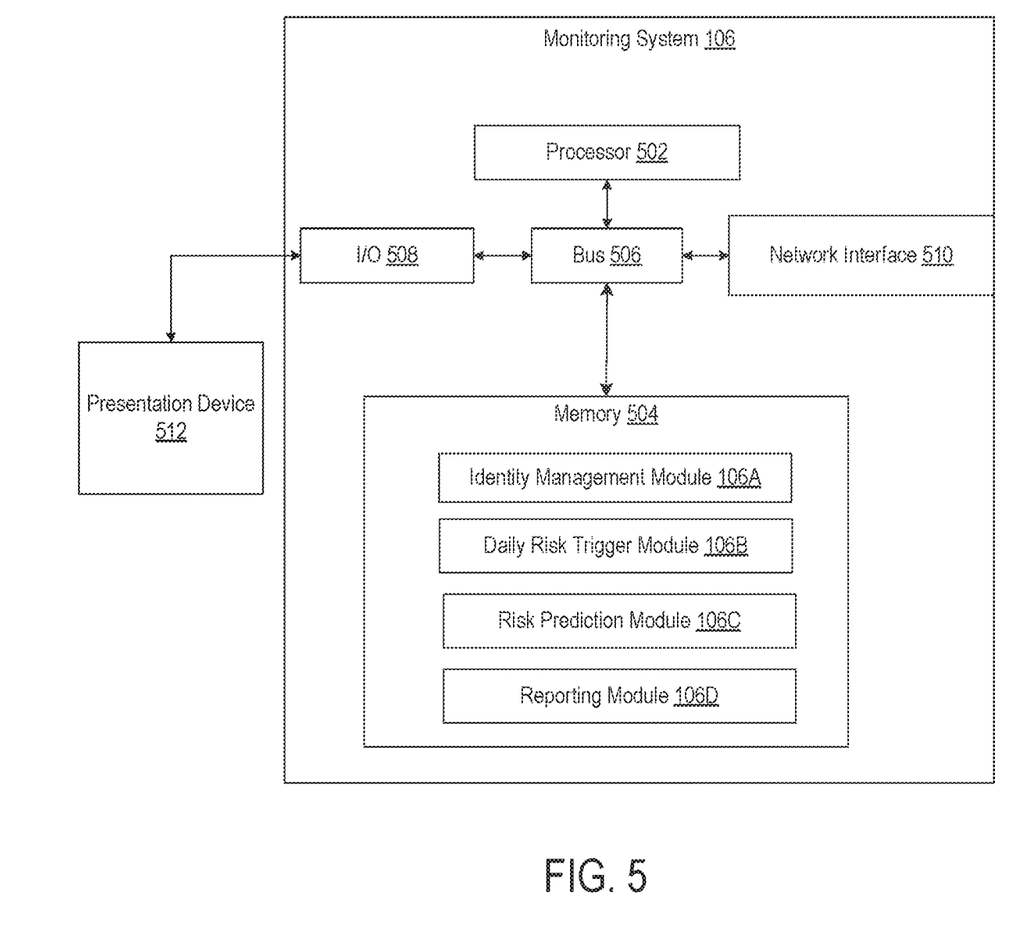
FIG. 5 is a block diagram depicting an example of a computing system that can be used to execute modules for continuous and anonymous risk evaluation, according to certain aspects of the present disclosure.

Any suitable computing system or group of computing systems can be used to perform the anonymous risk monitoring operations described herein. For example, FIG. 5 is a block diagram depicting an example of a monitoring system 106. The example of the monitoring system 106 can include various devices for communicating with other devices in the operating environment 100, as described with respect to FIG. 1. The monitoring system 106 can include various devices for performing one or more risk monitoring operations as described above with respect to FIGS. 1-4.

The monitoring system 106 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The monitoring system 106 may also include a number of external or internal devices such as input or output devices. For example, the monitoring system 106 is shown with an input/output interface 508 that can receive input from input devices or provide output to output devices. A bus 506 can also be included in the monitoring system 106. The bus 506 can communicatively couple one or more components of the monitoring system 106.

The monitoring system 106 can execute program code that includes the identity management module 106A, the risk prediction module 106C, and the reporting module 106D. The program code for the identity management module 106A, the risk prediction module 106C, and the reporting module 106D may be resident in any suitable computer-readable medium and may be executed on any suitable processing device. For example, as depicted in FIG. 5, the program code for the identity management module 106A, the risk prediction module 106C, and the reporting module 106D can reside in the memory 504 at the monitoring system 106. Executing the identity management module 106A, the risk prediction module 106C, and the reporting module 106D can configure the processor 502 to perform the operations described herein.

In some aspects, the monitoring system 106 can include one or more output devices. One example of an output device is the network interface device 510 depicted in FIG. 5. A network interface device 510 can include any device or group of devices suitable for establishing a wired or wireless data connection to one or more networks 104. Non-limiting examples of the network interface device 510 include an Ethernet network adapter, a modem, etc. Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A monitoring computing system comprising a server computer, the server computer comprising a processor and a non-transitory computer-readable medium coupled to the processor, the non-transitory computer-readable medium including instructions which, when executed by the processor, cause performance of a method comprising:

receiving, from a requesting entity computer over a network, a request for monitoring of a plurality of target entities, the request comprising, for each target entity, of the plurality of target entities, a first identifier associated with the target entity;

for each target entity, of the plurality of target entities:
generating a second identifier associated with the target entity based on information about the target entity, the second identifier being prevented from being provided to the requesting entity computer;
monitoring a periodically updated data set and determining a risk metric for the target entity based on monitoring the periodically updated data set;
automatically generating a third identifier associated with the risk metric of the target entity based on one or more rules and without further input from the requesting entity computer;
storing, to a database, a mapping of the second identifier to the first identifier and the third identifier to the first identifier and the second identifier;
identifying a plurality of third identifiers corresponding to a subset of the plurality of target entities with indicators of an increased insider threat risk;
providing the third identifiers to the requesting entity computer over the network, wherein providing the third identifiers comprises causing display of a user interface including a visualization of risk data for the subset of the plurality of target entities that includes the third identifiers, wherein the visualization of risk data provides for continuous anonymous insider threat risk evaluations of the subset of the plurality of target entities via the display of the user interface on the requesting entity computer;
responsive to providing the third identifiers, receiving, from the requesting entity computer over the network, a request for a first identifier associated with a particular third identifier, wherein a user interacts with the user interface to select information associated with the particular third identifier to initiate sending the request for the first identifier;
responsive to the request and based on the particular third identifier, providing the requested first identifier with the particular third identifier back to the requesting entity computer over the network; and responsive to providing the first identifier, updating target entity information stored by the monitoring computing system to include a soft credit hit, wherein the monitoring of the periodically updated data set and the providing of the third identifiers and the visualization of the risk data to the requesting entity computer do not result in adding the soft credit hit to the target entity information stored by the monitoring computing system.

2. The system of claim 1, the method further comprising:
determining the risk metric using a predictive model, wherein the predictive model includes one or more of a logistic regression model or a neural network.

3. The system of claim 2, the method further comprising:
comparing the risk metric of the target entity to a threshold value, wherein the third identifier is generated based on the comparison;
receiving, from the requesting entity computer, configuration data comprising the threshold value; and
based on the threshold value, customizing the predictive model for the requesting entity.

4. The system of claim 2, wherein the predictive model is trained on data from a general population of entities segmented based on age and income level to approximate a target population of entities.

5. The system of claim 1, wherein providing the third identifier further comprises transmitting, by the server computer to the requesting entity computer over the network, a risk report which includes the third identifier.

6. The system of claim 1, wherein:
the target entities are employees of a requesting entity associated with the requesting entity computer;
the requesting entity is an employer;
the target entities hold security clearances; and
the risk metric indicates a subset of the target entities that are likely to lose eligibility for respective security clearances.

7. The system of claim 1, wherein the risk metric corresponds to one or more of: a number of days past due on a credit instrument, an amount of debt, a criminal record status, an employment status, a number of credit instruments held by the target entity, or an amount of funds held by the target entity.

8. A computer-implemented method for insider threat monitoring comprising:
receiving, by server computer of a monitoring computing system from a requesting entity computer over a network, a request for monitoring of a plurality of target entities, the request comprising, for each target entity, of the plurality of target entities, a first identifier associated with the target entity;
for each target entity, of the plurality of target entities:
generating, by the server computer, a second identifier associated with the target entity based on information about the target entity, the second identifier being prevented from being provided to the requesting entity computer;
monitoring, by the server computer, a periodically updated data set and determining a risk metric for the target entity based on monitoring the periodically updated data set;
automatically generating a third identifier associated with the risk metric of the target entity based on one or more rules and without further input from the requesting entity computer; and
storing, to a database, a mapping of the second identifier to the first identifier and the third identifier to the first identifier and the second identifier;
identifying a plurality of third identifiers corresponding to a subset of the plurality of target entities with indicators of an increased insider threat risk;
providing, by the server computer, the plurality of third identifiers to the requesting entity computer over the network, wherein providing the third identifiers comprises causing display of a user interface including a visualization of risk data for the subset of the plurality of target entities that includes the third identifiers, wherein the visualization of risk data provides for continuous anonymous insider threat risk evaluations of the subset of the plurality of target entities via the display of the user interface on the requesting entity computer;
responsive to providing the plurality of third identifiers, receiving, by the server computer from the requesting entity computer over the network, a request for a first identifier associated with a particular third identifier, of the plurality of third identifiers, wherein a user interacts with the user interface to select information associated with the particular third identifier to initiate sending the request for the first identifier;
providing, by the server computer to the requesting entity computer over the network, the requested first identifier and the particular third identifier; and
responsive to providing the first identifier, updating target entity information stored by the monitoring computing system to include a soft credit hit, wherein the monitoring of the periodically updated data set and the providing of the third identifiers and the visualization of the risk data to the requesting entity computer do not result in adding the soft credit hit to the target entity information stored by the monitoring computing system.

9. The method of claim 8, further comprising determining the risk metric using a predictive model, wherein the predictive model includes one or more of a logistic regression model or a neural network.

10. The method of claim 9, further comprising:
comparing the risk metric of the target entity to a threshold value, wherein the third identifier is generated based on the comparison;
receiving, from the requesting entity computer, configuration data comprising the threshold value; and
based on the threshold value, customizing the predictive model for the requesting entity.

11. The method of claim 9, wherein the predictive model is trained on data from a general population of entities segmented based on age and income level to approximate a target population of entities.

12. The method of claim 8, wherein providing the third identifier further comprises transmitting, by the server computer to the requesting entity computer over the network, a risk report comprising the third identifier.

13. The method of claim 8, wherein:
the target entities are employees of a requesting entity associated with the requesting entity computer;
the requesting entity is an employer;
the target entities hold security clearances; and
the risk metric indicates a subset of the target entities that are likely to lose eligibility for respective security clearances.

14. The method of claim 8, wherein the risk metric corresponds to one or more of: a number of days past due on a credit instrument, an amount of debt, a criminal record status, an employment status, a number of credit instruments held by the target entity, or an amount of funds held by the target entity.

15. A non-transitory computer-readable medium of a monitoring computing system having instructions stored thereon, the instructions, when executed by a processing device, cause performance of a method comprising:
 receiving, from a requesting entity computer over a network, a request for monitoring of a plurality of target entities, the request comprising, for each target entity, of the plurality of target entities, a first identifier associated with the target entity;
 for each target entity, of the plurality of target entities:
  generating a second identifier associated with the target entity based on information about the target entity, the second identifier being prevented from being provided to the requesting entity computer;
  monitoring a periodically updated data set and determining a risk metric for the target entity based on monitoring the periodically updated data set;
  automatically generating a third identifier associated with the risk metric of the target entity based on one or more rules and without further input from the requesting entity computer; and
  storing, to a database, a mapping of the second identifier to the first identifier and the third identifier to the first identifier and the second identifier;
  identifying a plurality of third identifiers corresponding to a subset of the plurality of target entities with indicators of an increased insider threat risk;
 providing the third identifiers to the requesting entity computer over the network, wherein providing the third identifiers comprises causing display of a user interface including a visualization of risk data for the subset of the plurality of target entities that includes the third identifiers, wherein the visualization of risk data provides for continuous anonymous insider threat risk evaluations of the subset of the plurality of target entities via the display of the user interface on the requesting entity computer;
 responsive to providing the third identifiers, receiving, from the requesting entity computer over the network, a request for a first identifier associated with a particular third identifier, wherein a user interacts with the user interface to select information associated with the particular third identifier to initiate sending the request for the first identifier;
 responsive to the request and based on the particular third identifier, providing the requested first identifier and the particular third identifier to the requesting entity computer over the network; and
 responsive to providing the first identifier, updating target entity information stored by the monitoring computing system to include a soft credit hit, wherein the monitoring of the periodically updated data set and the providing of the third identifiers and the visualization of the risk data to the requesting entity computer do not result in adding the soft credit hit to the target entity information stored by the monitoring computing system.

\* \* \* \* \*